US012696909B2

(12) United States Patent
Simonsen et al.

(10) Patent No.: US 12,696,909 B2
(45) Date of Patent: Aug. 4, 2026

(54) VEGETABLE FAT COMPOSITION COMPRISING C14 FATTY ACIDS AND OTHER SATURATED FATTY ACIDS

(71) Applicant: AAK AB (PUBL), Malmö (SE)

(72) Inventors: Hannah Solati Simonsen, Hinnerup (DK); Morten Daugaard Andersen, Højbjerg (DK)

(73) Assignee: AAK AB (PUBL), Malmö (SE)

( * ) Notice: Subject to any disclaimer, the term of this patent is extended or adjusted under 35 U.S.C. 154(b) by 464 days.

(21) Appl. No.: 18/042,476

(22) PCT Filed: Aug. 26, 2021

(86) PCT No.: PCT/SE2021/050828

§ 371 (c)(1),
(2) Date: Feb. 22, 2023

(87) PCT Pub. No.: WO2022/045952

PCT Pub. Date: Mar. 3, 2022

(65) Prior Publication Data

US 2023/0329267 A1 Oct. 19, 2023

(30) Foreign Application Priority Data

Aug. 31, 2020 (SE) .................................... 2051004-6

(51) Int. Cl.

| | |
|---|---|
| ***A23D 9/02*** | (2006.01) |
| ***A21D 13/24*** | (2017.01) |
| ***A21D 13/28*** | (2017.01) |
| ***A23G 1/30*** | (2006.01) |
| ***A23G 1/38*** | (2006.01) |
| ***C11C 3/02*** | (2006.01) |

(52) U.S. Cl.
CPC ............... *A23D 9/02* (2013.01); *A21D 13/24* (2017.01); *A21D 13/28* (2017.01); *A23G 1/305* (2013.01); *A23G 1/38* (2013.01); *C11C 3/02* (2013.01)

(58) Field of Classification Search
None
See application file for complete search history.

(56) References Cited

U.S. PATENT DOCUMENTS

| | | | | |
|---|---|---|---|---|
| 2,539,518 | A | 1/1951 | Mayberry | |
| 6,171,636 | B1 * | 1/2001 | Sassen | A23D 7/02 426/607 |
| 2011/0166227 | A1 | 7/2011 | Perlman et al. | |
| 2012/0203018 | A1 | 8/2012 | Franklin et al. | |

FOREIGN PATENT DOCUMENTS

| | | | | |
|---|---|---|---|---|
| EP | 0 093 602 | A2 | 11/1983 | |
| EP | 0 920 809 | B1 | 1/2002 | |
| EP | 3 931 291 | A1 | 1/2022 | |
| JP | 3-43042 | A | 2/1991 | |
| JP | 11-155488 | A | 6/1999 | |
| JP | 2014511140 | A | 5/2014 | |
| JP | 2017-93310 | A | 6/2017 | |
| JP | 2018-148888 | A | 9/2018 | |
| WO | WO 2013/132284 | A1 | 9/2013 | |
| WO | WO 2014/141904 | A1 | 9/2014 | |
| WO | WO 2016/200323 | A1 | 12/2016 | |
| WO | WO-2018117950 | A1 * | 6/2018 | A23D 9/00 |
| WO | WO 2020/178180 | A1 | 9/2020 | |
| WO | WO 2021/107857 | A1 | 6/2021 | |

OTHER PUBLICATIONS

Culp et al., "Analysis of Triglycerides by Consecutive Chromatographic Techniques II Ucuhuba Kernel Fat". Journal of the American Oil Chemists' Society vol. 42, pp. 974-978. Nov. 1965. (Year: 1965).*
International Search Report for PCT/SE2021/050828, mailed Sep. 16, 2021, 4 pages.
Written Opinion of the International Search Authority for PCT/SE2021/050828, mailed Sep. 16, 2021, 4 pages.

* cited by examiner

*Primary Examiner* — Erik Kashnikow
*Assistant Examiner* — Assaf Zilbering
(74) *Attorney, Agent, or Firm* — Finnegan, Henderson, Farabow, Garrett & Dunner LLP

(57) ABSTRACT

Disclosed is a vegetable fat composition comprising different triglycerides with at least some of the triglycerides comprising C14-fatty acids. The vegetable fat composition is for use in bakery, dairy, or confectionary applications or in chocolate or chocolate-like coating, as well as a method of producing said vegetable fat composition. A vegetable fat composition as disclosed has some of the properties from cocoa butter substitute and some of the properties from cocoa butter replacer, combined in one product, in addition to being a cost effective vegetable fat composition.

14 Claims, No Drawings

VEGETABLE FAT COMPOSITION COMPRISING C14 FATTY ACIDS AND OTHER SATURATED FATTY ACIDS

The present application is a national stage entry of PCT/SE2021/050828, filed Aug. 26, 2021, which claims priority to Swedish Application No. 2051004-6, filed Aug. 31, 2020. The entire contents of each application are hereby incorporated by reference.

TECHNICAL FIELD OF THE INVENTION

The present invention relates to a vegetable fat composition comprising different triglycerides with at least some of the triglycerides comprising C14-fatty acids. The invention also relates to uses of the vegetable fat composition in bakery, dairy, or confectionary applications or in chocolate or chocolate-like coating, as well as a method of producing said vegetable fat composition.

BACKGROUND OF THE INVENTION

The main dietary source of industrial trans-unsaturated fatty acids are partially hydrogenated vegetable oils. The World Health Organization argues that the removal of partially hydrogenated vegetable oils from the food supply would result in substantial health benefits.

After determining in June 2015 that partially hydrogenated oils (PHOs) were no longer 'generally recognized as safe' for use in human food, the United States Food and Drug Administration requested food manufacturers to remove them from products by June 2018.

The European Union does not currently have legislation regulating the content of trans-unsaturated fatty acids in food products or requiring their labelling. Thus, should a product contain partially hydrogenated oils (and hence, possibly trans-unsaturated fatty acids), its label will indicate this, but it will not indicate the exact amount of trans-unsaturated fatty acids present in said product.

However, more and more EU Member States are setting legal limits on industrially produced trans-unsaturated fatty acids in foods and there has been growing pressure to establish this as an EU-wide practice. This legislation trend about non-trans-unsaturated fatty acids is not only present in EU and US but is spreading all over the world. In Russia, from January 2018, legislation changed the safety parameter "trans-isomers of fatty acids" from 20% to 2% of the product's fat content.

Increasing global transformation from high-trans cocoa butter replacer (CBR) to low/no-trans CBR due to legislations will be a big challenge for confectionery producers of high-trans CBR, especially to limit/eliminate trans containing applications while maintaining the good properties of such products.

Moreover, the customers who already switched from a high-trans CBR to a low-trans CBR solution seems not to be fully satisfied with the different solutions from fat and oil producers.

Using high-trans CBR has the advantages of a short setting time, high gloss, high cocoa butter (CB) tolerance, and a non-lauric product (i.e. the fatty acids do not contain lauric acid), while it has the obvious disadvantage of a high trans-unsaturated fatty acids content.

Using low-trans (or non-trans) CBR has the advantages of a low to no content trans-unsaturated fatty acids and it contains a similar saturated fatty acid content compared to CB, while it has the disadvantages of a longer setting time, a less glossy end product, lower cocoa butter tolerance, and a poorer meltdown, all compared to high-trans CBR.

Using high-end cocoa butter substitute (CBS) has the advantages of a very short setting time, a high gloss in the end product, and a good meltdown, while having the disadvantages of a low CB tolerance, a high amount of SAFA of 90 wt. % or more, a potential risk of soapy off flavor if the process on the compound line is poorly controlled due to a relatively high amount of lauric fatty acids (C12:0), and a poor flexibility to interchange CBR and CBS products on the same compound line due to risk of contaminating a CBR product with a CBS product.

For the above reasons, vegetable oil producers are currently finding themselves in the quest for a product which can combine the best functions from the CBS (e.g. fast setting time and high gloss) with the attractive functionality from the CBR (e.g. no risk for soapy taste, lower SAFA content, and possibly maintaining a clean label (i.e. low to no content trans-unsaturated fatty acids).

Accordingly, the main object of the invention is to provide a vegetable fat product, which combines the best functions from the CBS with the attractive functionality from the CBR.

Another object is to provide a vegetable fat product with a low risk of soapy off flavor and a comparable price to already commercially available CBB products, said vegetable fat product is in the form of a vegetable fat composition, which is also cost effective.

Yet another object is to provide a number of applications for such fat compositions.

SUMMARY OF THE INVENTION

Disclosed herein in a first aspect is a vegetable fat composition comprising: from 4% to 50% by weight of C14-fatty acids compared to the total weight of fatty acids; from 40% to 95% by weight of saturated fatty acids compared to the total weight of fatty acids; a ratio of the weight of C14-fatty acids to the total weight of C12- and C14-fatty acids between 0.40 and 1.00; from 15% to 70% by weight of the sum of SatSatO and SatOSat triglycerides compared to the total weight of triglycerides; a ratio of the weight of SatSatO triglycerides to the weight of SatOSat triglycerides between 1.0 and 5.0; wherein Sat is saturated fatty acids selected from C16-, C18-, C20-, C22-, and/or C24-fatty acids, and wherein O is oleic acid (C18:1).

The vegetable fat composition of the present invention has, combined in one product, some of the properties from CBS, such as fast crystallization speed and high gloss; some of the properties from CBR, such as no or a low risk of soapy taste due to a relatively low content of lauric acid (C12:0) and lower molecular weight fatty acids (e.g. C10 and C8). Additionally, a vegetable fat composition as disclosed is also a cost-effective vegetable fat composition with at least a comparable price compared to product on the market today.

Disclosed herein in a second aspect is a use of a vegetable fat composition according to the first aspect for bakery, dairy, or confectionary applications, or in coating or enrobing for bakery or confectionary applications, such as bakery or confectionary application, selected from biscuit, cake, muffin, donut, pastry, or bread applications; or in fillings, such as bakery fillings and confectionary fillings; or for chocolate and chocolate-like coatings; or for chocolate or chocolate-like spreads, which are spreadable at room temperature.

Disclosed herein in a third aspect is a process for obtaining a vegetable fat composition according to the first aspect, wherein the process comprises the steps of mixing a first triglyceride composition and a second triglyceride composition, wherein the first triglyceride composition is added in an amount of between 5% and 80% by weight compared to the total weight of the sum of the first triglyceride composition and the second triglyceride composition, and wherein the second triglyceride composition is added in an amount of between 20% and 95% by weight compared to the total weight of the sum of the first triglyceride composition and the second triglyceride composition; wherein the first triglyceride composition comprises fatty acids randomly distributed on a glycerol backbone, and wherein the first triglyceride composition comprises: from 20% to 90% by weight of C14-fatty acids compared to the total weight of fatty acids in the first triglyceride composition; from 0% to 50% by weight of the sum of saturated C16-, C18-, C20-, C22-, C24-fatty acids compared to the total weight of fatty acids in the first triglyceride composition; from 50% to 100% by weight of saturated fatty acids compared to the total weight of fatty acids in the first triglyceride composition; and a ratio of the weight of C14-fatty acids to the total weight of C12- and C14-fatty acids in the first triglyceride composition between 0.40 and 1.00; and wherein the second triglyceride composition comprises: from 30% to 80% by weight of the sum of saturated C16-, C18-, C20-, C22-, C24-fatty acids compared to the total weight of fatty acids in the second triglyceride composition; from 30% to 90% by weight of the sum of SatSatO and SatOSat triglycerides compared to the total weight of triglycerides in the second triglyceride composition; and a ratio of the weight of SatSatO triglycerides to the weight of SatOSat triglycerides in the second triglyceride composition between 1.0 and 5.0; wherein Sat is saturated fatty acids selected from C16-, C18-, C20-, C22-, and/or C24-fatty acids, and wherein O is oleic acid (C18:1), hereby obtaining the vegetable fat composition according to the first aspect.

Disclosed herein in a fourth aspect is a confectionary or chocolate or chocolate-like product comprising between 25% and 70% by weight, such as between 25% and 60%, such as between 25% and 50%, such as between 25% and 40%, such as between 28% and 40% by weight of a vegetable fat composition according to the first aspect.

Definitions

As used herein, the term "vegetable" shall be understood as originating from a plant or a single cell organism. Thus, vegetable fat or vegetable triglycerides are still to be understood as vegetable fat or vegetable triglycerides if all the fatty acids used to obtain said triglyceride or fat is of plant or single cell organism origin.

Saturated fatty acids (SAFA) are chains of carbon atoms joined by single bonds, with the maximum number of hydrogen atoms attached to each carbon atom in the chain. Unsaturated fatty acids are chains of carbon atoms joined by single bonds and varying numbers of double bonds, which do not have their full quota of hydrogen atoms attached. An unsaturated acid can exist in two forms, the cis form and the trans form. A double bond may exhibit one of two possible configurations: trans or cis. In trans configuration (a trans fatty acid), the carbon chain extends from opposite sides of the double bond, whereas, in cis configuration (a cis fatty acid), the carbon chain extends from the same side of the double bond. The trans fatty acid is a straighter molecule. The cis fatty acid is a bent molecule.

In this application, "Sat" means a subgroup of saturated fatty acid. The saturated fatty acid referred to herein as "Sat" are the saturated fatty acid selected from C16-, C18-, C20-, C22-, and/or C24-fatty acids. The fatty acids, which are comprised in the triglycerides of formulae SatSatO, SatOSat, etc, and referred to in the ratio of SatSatO to SatOSat, may be identical or different, saturated fatty acids. O is oleic acid, which is an unsaturated fatty acid.

Using the terminology that a value is in a range, such as when stating that A is between X and Y, means that both values X and Y are also included in the range. Such ranges are seen as disclosed similar to a range stating that A is in an amount from X to Y. An example from the description could be that the ratio of the weight of C14-fatty acids to the total weight of C12- and C14-fatty acids between 0.40 and 1.00, means that both 0.40 and 1.00 is included in the range from 0.40 to 1.00, hereby disclosing all numbers in such range with both endpoints included. This is meant for all ranges disclosed herein unless specifically stated otherwise.

Using the nomenclature CX means that the fatty acid comprises X carbon atoms, e.g. a C14 fatty acid has 14 carbon atoms while a C16 fatty acid has 16 carbon atoms.

Using the nomenclature CX:Y means that the fatty acid comprises X carbon atoms and Y double bonds, e.g. a C14:0 fatty acid has 14 carbon atoms and 0 double bonds while a C18:1 fatty acid has 18 carbon atoms and 1 double bond.

A ratio of the weight of C14-fatty acids to the total weight of C12- and C14-fatty acids means that the weight of C14-fatty acids is divided by the sum of weights of C12 and C14-fatty acids (C14/(C12+C14)).

A ratio of the weight of SatSatO triglycerides to the weight of SatOSat triglycerides means that the weight of SatSatO triglycerides is divided by the weight of SatOSat triglycerides (SatSatO/SatOSat).

As used herein, "%" or "percentage" relates to weight percentage i.e. wt. % or wt.-% if nothing else is indicated.

As used herein, "vegetable oil" and "vegetable fat" are used interchangeably, unless otherwise specified.

As used herein the term "single cell oil" shall mean oil from oleaginous microorganisms which are species of yeasts, molds (fungal), bacteria and microalgae. These single cell oils are produced intracellular and in most cases during the stationary growth phase under specific growth conditions (e.g. under nitrogen limitation with simultaneous excess of a carbon source). Examples of oleaginous microorganisms are, but not limited to, *Mortierella alpineea, Yarrowia lipolytica, Schizochytrium, Nannochloropsis, Chlorella, Crypthecodinium cohnii, Shewanella.*

As used herein "cocoa butter replacer" is intended to mean an edible fat having a triglyceride composition significantly different to cocoa butter. Cocoa butter replacers can have from high to low and even no trans fatty acids in its triglyceride composition. Cocoa butter replacers are only mixable with cocoa butter in medium to small ratios. Furthermore, in contrast to chocolate, cocoa butter replacer-based compounds do not need to undergo a treatment at different temperatures, known as tempering, prior to molding, coating, or enrobing, in order to obtain a final product with acceptable shelf life.

As used herein "edible" is something that is suitable for use as food or as part of a food product, such as a dairy or confectionary product.

For products and methods in the confectionery areas, reference is made to "Chocolate, Cocoa and Confectionery", B. W. Minifie, Aspen Publishers Inc., 3. Edition 1999.

A food product is a product for human consumption. An important group of products is those where cocoa butter and cocoa butter-like fats are used.

By a chocolate or chocolate-like product is meant a product, which at least is experienced by the consumer as chocolate or as a confectionery product having sensorial attributes common with chocolate, such as e.g. melting profile, taste etc. Some chocolate comprises cocoa butter, typically in substantial amounts, where some chocolate-like product may be produced with a low amount of or even without cocoa butter, e.g. by replacing the cocoa butter with a cocoa butter equivalent, cocoa butter substitute, etc. In addition, many chocolate or chocolate-like products comprise cocoa powder or cocoa mass, although some chocolate or chocolate-like products, such as typical white chocolates, may be produced without cocoa powder, but e.g. drawing its chocolate taste from cocoa butter. Depending on the country and/or region there may be various restrictions on which products may be marketed as chocolate.

The term "comprising" or "to comprise" is to be interpreted as specifying the presence of the stated parts, steps, features, or components, but does not exclude the presence of one of more additional parts, steps, features, or components.

As used herein, the term "and/or" is intended to mean the combined ("and") and the exclusive ("or") use, i.e. "A and/or B" is intended to mean "A alone, or B alone, or A and B together".

DETAILED DESCRIPTION OF THE INVENTION

When describing the below embodiments, the present invention envisages all possible combinations and permutations of the below described embodiments with the above disclosed aspects.

The invention relates to a vegetable fat composition comprising: from 4% to 50% by weight of C14-fatty acids compared to the total weight of fatty acids; from 40% to 95% by weight of saturated fatty acids compared to the total weight of fatty acids; a ratio of the weight of C14-fatty acids to the total weight of C12- and C14-fatty acids between 0.40 and 1.00; from 15% to 70% by weight of the sum of SatSatO and SatOSat triglycerides compared to the total weight of triglycerides; a ratio of the weight of SatSatO triglycerides to the weight of SatOSat triglycerides between 1.0 and 5.0; wherein Sat is saturated fatty acids selected from C16-, C18-, C20-, C22-, and/or C24-fatty acids, and wherein O is oleic acid (C18:1).

In one or more embodiments, Sat is saturated fatty acids individually selected from C16-, C18-, C20-, C22-, and/or C24-fatty acids.

By selected from C16-, C18-, C20-, C22-, and/or C24-fatty acids is meant that the "Sat" in SatSatO and SatOSat is selected the same saturated fatty acid, meaning that SatSatO can be e.g., C16C160 (PPO) or C18C180 (SSO). By individually selected from C16-, C18-, C20-, C22-, and/or C24-fatty acids is meant that the "Sat" in SatSatO and SatOSat is not per se selected to be the same saturated fatty acid, meaning that SatSatO can be e.g., C16C180 (PSO) or C18C160 (SPO).

In one or more embodiments, Sat is saturated fatty acids selected from C16- and C18-fatty acids.

In one or more embodiments, Sat is saturated fatty acids individually selected from C16- and C18-fatty acids.

In one or more embodiments, the C14-fatty acids are saturated fatty acids (C14:0). A C14:0 fatty acid is also known as myristic acid.

In one or more embodiments, the vegetable fat composition comprises from 5% to 40% by weight of C14-fatty acids compared to the total weight of fatty acids, such as from 5% to 35%, such as from 5% to 30%, such as from 6% to 30%, such as from 6% to 25%, or such as from 6% to 20% by weight of C14-fatty acids compared to the total weight of fatty acids.

By from 5% to 40% by weight of C14-fatty acids compared to the total weight of fatty acids is meant that between 5% and 40% of the total weight of fatty acids in the triglycerides of the vegetable fat composition is from C14-fatty acids.

In one or more embodiments, the vegetable fat composition comprises from 6% to 25% by weight of C14-fatty acids compared to the total weight of fatty acids. In one or more embodiments, the vegetable fat composition comprises from 6% to 20% by weight of C14-fatty acids compared to the total weight of fatty acids.

In one or more embodiments, the vegetable fat composition comprises from 45% to 95% by weight of saturated fatty acids compared to the total weight of fatty acids, such as from 45% to 90%, such as from 50% to 90%, such as from 55% to 90%, such as from 60% to 90%, such as from 60% to 85%, such as from 60% to 80%, such as from 60% to 75%, or such as from 65% to 75% by weight of saturated fatty acids compared to the total weight of fatty acids.

By from 45% to 95% by weight of saturated fatty acids compared to the total weight of fatty acids is meant that between 45% and 95% of the total weight of fatty acids in the triglycerides of the vegetable fat composition is saturated fatty acids. Saturated fatty acids are chains of carbon atoms joined by single bonds, with the maximum number of hydrogen atoms attached to each carbon atom in the chain, in accordance with the above definitions.

In one or more embodiments, the vegetable fat composition comprises from 60% to 75% by weight of saturated fatty acids compared to the total weight of fatty acids. In one or more embodiments, the vegetable fat composition comprises from 65% to 75% by weight of saturated fatty acids compared to the total weight of fatty acids.

In one or more embodiments, the amount of saturated fatty acids is comparable to the amount of saturated fatty acids in cocoa butter.

By comparable to cocoa butter is meant that the saturated fatty acid level in the vegetable fat composition is similar to the saturated fatty acid level found in cocoa butter. Cocoa butter comprises between 57% and 64% saturated fatty acids and between 36% and 43% unsaturated fatty acids. This means that in one or more embodiments the vegetable fat composition comprises between 57% and 64% by weight of saturated fatty acids compared to the total weight of fatty acids.

In one or more embodiments, the ratio of the weight of C14-fatty acids to the total weight of C12- and C14-fatty acids (C14/(C12+C14)) is between 0.45 and 1.00, such as between 0.50 and 1.00, such as between 0.60 and 1.00, such as between 0.70 and 1.00, or such as between 0.70 and 0.90. In one or more embodiments, the ratio of the weight of C14-fatty acids to the total weight of C12- and C14-fatty acids is between 0.50 and 1.00. In one or more embodiments, the ratio of the weight of C14-fatty acids to the total weight of C12- and C14-fatty acids is between 0.70 and 0.90.

In one or more embodiments, the vegetable fat composition comprises from 20% to 70% by weight of the sum of SatSatO and SatOSat triglycerides compared to the total weight of triglycerides, such as from 20% to 65%, such as from 20% to 60%, such as from 20% to 55% by weight of the sum of SatSatO and SatOSat triglycerides compared to the total weight of triglycerides.

By from 20% to 70% by weight of the sum of SatSatO and SatOSat triglycerides compared to the total weight of triglycerides is meant that the total amount of SatSatO and SatOSat triglycerides is between 20% and 70% of the total weight of triglycerides of the vegetable fat composition.

In one or more embodiments, the vegetable fat composition comprises from 20% to 55% by weight of the sum of SatSatO and SatOSat triglycerides compared to the total weight of triglycerides.

In one or more embodiments, the ratio of the weight of SatSatO triglycerides to the weight of SatOSat triglycerides in the vegetable fat composition is between 1.0 and 4.0, such as between 1.0 and 3.0, such as between 1.0 and 2.5, such as between 1.2 and 2.5, or such as between 1.4 and 2.5. In one or more embodiments, the ratio of the weight of SatSatO triglycerides to the weight of SatOSat triglycerides in the vegetable fat composition is between 1.4 and 2.5.

In any of the above embodiments, the ratio of SatSatO to SatOSat in the triglycerides may be between 1.0 and 5.0, wherein SatSatO is an asymmetrical di-saturated triglyceride comprising two saturated fatty acids and one oleic acid (an unsaturated fatty acid) in an asymmetrical isomer, and wherein SatOSat is a symmetrical di-saturated triglyceride comprising two saturated fatty acids and one oleic acid in a symmetrical isomer.

The SatSatO/SatOSat ratio may be measured/calculated in the vegetable composition. A ratio of SatSatO to SatOSat means that the weight of SatSatO-triglycerides is divided by the weight of SatOSat-triglycerides (SatSatO/SatOSat), where Sat means a saturated fatty acid, and O means an oleic acid. SatSatO is an asymmetrical di-saturated triglyceride in which a saturated fatty acid occupies the sn1 and sn2 positions, and an oleic acid occupies the sn3 position; or a saturated fatty acid occupies the sn2 and sn3 positions, and an oleic acid occupies the sn1 position. SatOSat is a symmetrical di-saturated triglyceride in which a saturated fatty acid occupies the sn1 and sn3 positions, and an oleic acid occupies the sn2 position.

Sn1/sn2/sn3:

Fischer projection of a natural L-glycerol derivative

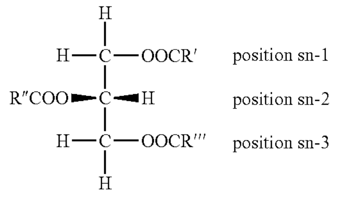

In general, triglycerides use a "sn" notation, which stands for stereospecific numbering. In a Fischer projection of a natural L-glycerol derivative, the secondary hydroxyl group is shown to the left of C-2; the carbon atom above this then becomes C-1 and that below becomes C-3. The prefix 'sn' is placed before the stem name of the compound.

In one or more embodiments, the vegetable fat composition comprises: from 6% to 25% by weight of C14-fatty acids compared to the total weight of fatty acids; from 60% to 75% by weight of saturated fatty acids compared to the total weight of fatty acids; a ratio of the weight of C14-fatty acids to the total weight of C12- and C14-fatty acids between 0.50 and 1.00; from 20% to 55% by weight of the sum of SatSatO and SatOSat triglycerides compared to the total weight of triglycerides; a ratio of the weight of SatSatO triglycerides to the weight of SatOSat triglycerides between 1.4 and 2.5. In one or more embodiments, the vegetable fat composition comprises: from 6% to 20% by weight of C14-fatty acids compared to the total weight of fatty acids; from 65% to 75% by weight of saturated fatty acids compared to the total weight of fatty acids; a ratio of the weight of C14-fatty acids to the total weight of C12- and C14-fatty acids between 0.70 and 0.90; from 20% to 55% by weight of the sum of SatSatO and SatOSat triglycerides compared to the total weight of triglycerides; a ratio of the weight of SatSatO triglycerides to the weight of SatOSat triglycerides between 1.4 and 2.5.

In one or more embodiments, the vegetable fat composition has a solid fat content (SFC) value at 35° C. of 20 or less, such as 19 or less, such as 18 or less, such as 17 or less, such as 16 or less, or such as 15 or less, wherein the solid fat content is measured by IUPAC 2.150a.

Solid fat content (SFC) is a measure of the percentage of fat in crystalline (solid) phase to total fat (the remainder being in liquid phase) across a temperature gradient. In theory, SFC values can be any number from 0 to 100; however, due to detection limits of the instrument used in the method in effect the boundaries are around 0.5 to 98.

In one or more embodiments, the vegetable fat composition has a solid fat content (SFC) value at 20° C. of 20 or more, such as 30 or more, such as 40 or more, such as 50 or more, such as 60 or more, such as 80 or more, or such as 85 or more, wherein the solid fat content is measured by IUPAC 2.150a. In one or more embodiments, the vegetable fat composition has a solid fat content (SFC) value at 40° C. of 20 or less, such as 18 or less, such as 16 or less, such as 14 or less, such as 12 or less, or such as 10 or less, wherein the solid fat content is measured by IUPAC 2.150a.

In one or more embodiments, the vegetable fat composition is not originating from a single cell organism.

In one or more embodiments, the vegetable fat composition comprises 20% or less by weight of C12-fatty acid compared to the total weight of fatty acids, such as 18% or less, such as 16% or less such as 14% or less, such as 12% or less, such as 10% or less, such as 7% or less, or such as 5% or less by weight of C12-fatty acid compared to the total weight of fatty acids.

By 20% or less by weight of C12-fatty acids compared to the total weight of fatty acids is meant that 20% or less of the total weight of fatty acids in the triglycerides of the vegetable fat composition is from C12-fatty acids.

In one or more embodiments, the vegetable fat composition is non-lauric, i.e. comprises no C12-fatty acids.

In one or more embodiments, the vegetable fat composition comprises 15% or less by weight of trans-unsaturated fatty acids compared to the total weight of fatty acids, such as 10 wt. % or less, such as 5 wt. % or less, such as 2 wt. % or less, or such as 1 wt. % or less by weight of trans-unsaturated fatty acids compared to the total weight of fatty acids.

By 15% or less by weight of trans-unsaturated fatty acids compared to the total weight of fatty acids is meant that 15% or less of the total weight of fatty acids in the triglycerides of the vegetable fat composition is from trans-unsaturated fatty acids.

In one or more embodiments, the vegetable fat composition is a non-trans vegetable fat composition.

In one or more embodiments, the vegetable fat composition is non-hydrogenated.

Hydrogenation is a process where unsaturated fatty acids are made partially saturated. Non-hydrogenated means not hydrogenated or un-hydrogenated. By subjecting unsaturated fatty acids to a process of hydrogenation (e.g. involving a combination of catalysts, hydrogen, and heat), the double bond opens, and hydrogen atoms bind to the carbon atoms, hereby saturating the double bond. While most of the unsaturated oil will either remain as was (on its double bond structure) or be converted to the corresponding saturated fatty acid, some of the double bonds may open during the hydrogenation process and then re-close in another double bond configuration, hereby converting a cis fatty acid to a trans fatty acid, or vice versa. A non-hydrogenated vegetable fat composition is a composition comprising only non-hydrogenated fatty acids, meaning that the process of hydrogenation has not been performed on the fatty acids in said composition.

The vegetable fat composition, which is a non-hydrogenated vegetable fat composition, is a vegetable fat composition, which maintains a clean label while still obtaining the properties from CBS and some of the properties from CBR.

In one or more embodiments, the vegetable fat composition comprises at least 5% by weight of unsaturated fatty acids compared to the total weight of fatty acids, such as at least 10%, such as at least 15%, or such as at least 20% by weight of unsaturated fatty acids compared to the total weight of fatty acids.

By at least 5% by weight of unsaturated fatty acids compared to the total weight of fatty acids is meant that at least 20% of the total weight of fatty acids in the triglycerides of the vegetable fat composition is from unsaturated fatty acids.

In one or more embodiments, the vegetable fat composition comprises 60% or less by weight of unsaturated fatty acids compared to the total weight of fatty acids, such as 50% or less, such as 40% or less, such as 30% or less, or such as 20% or less by weight of unsaturated fatty acids compared to the total weight of fatty acids. In one or more embodiments, the vegetable fat composition comprises between 5% and 60% by weight of unsaturated fatty acids compared to the total weight of fatty acids, such as between 10% and 50%, such as between 10% and 40%, such as between 15% and 40%, such as between 15% and 35%, such as between 20% and 35%, or such as between 25% and 35% by weight of unsaturated fatty acids compared to the total weight of fatty acids.

In one or more embodiments, the vegetable fat composition comprises between 5% and 60% by weight of C16-fatty acids compared to the total weight of fatty acids, such as 10% and 58%, such as 10% and 56%, such as 10% and 54%, such as 10% and 52%, or such as 15% and 52% by weight of C16-fatty acids compared to the total weight of fatty acids, wherein the C16-fatty acids are selected from C16:0 (palmitic acid), C16:1 (palmitoleic acid), or combinations hereof.

By between 5% and 60% by weight of C16-fatty acids is meant that between 5% and 60% of the total weight of fatty acids in the triglycerides is from C16-fatty acids, wherein the C16-fatty acids are selected from palmitic acid, palmitoleic acid, or combinations hereof.

In one or more embodiments, the vegetable fat composition comprises between 5% and 40% by weight of C18-fatty acids compared to the total weight of fatty acids, such as between 10% and 40%, such as between 15% and 40%, such as between 20% and 40% by weight of C18-fatty acids compared to the total weight of fatty acids, wherein the C18-fatty acids are selected from C18:0 (stearic acid), C18:1 (oleic acid), C18:2 (linoleic acid), or combinations hereof.

By between 5% and 60% by weight of C18-fatty acids is meant that between 5% and 60% of the total weight of fatty acids in the triglycerides is from C18-fatty acids, wherein the C18-fatty acids are selected from stearic acid, oleic acid, linoleic acid, or combinations hereof.

In one or more embodiments, the vegetable fat composition comprises between 0% and 25% by weight of stearic acid (C18:0) compared to the total weight of fatty acids, such as between 5% and 25%, such as between 5% and 20%, or such as between 10% and 20%.

In one or more embodiments, the vegetable fat composition is a cocoa butter replacer (CBR).

In one or more embodiments, the vegetable fat composition is composed of at least a first triglyceride composition and a second triglyceride composition; wherein the first triglyceride composition comprises fatty acids randomly distributed on a glycerol backbone, and wherein the first triglyceride composition comprises: from 20% to 90% by weight of C14-fatty acids compared to the total weight of fatty acids in the first triglyceride composition; from 0% to 50% by weight of the sum of saturated C16-, C18-, C20-, C22-, C24-fatty acids compared to the total weight of fatty acids in the first triglyceride composition; from 50% to 100% by weight of saturated fatty acids compared to the total weight of fatty acids in the first triglyceride composition; and a ratio of the weight of C14-fatty acids to the total weight of C12- and C14-fatty acids in the first triglyceride composition between 0.40 and 1.00; and wherein the second triglyceride composition comprises: from 30% to 80% by weight of the sum of saturated C16-, C18-, C20-, C22-, C24-fatty acids compared to the total weight of fatty acids in the second triglyceride composition; from 30% to 90% by weight of the sum of SatSatO and SatOSat triglycerides compared to the total weight of triglycerides in the second triglyceride composition; and a ratio of the weight of SatSatO triglycerides to the weight of SatOSat triglycerides in the second triglyceride composition between 1.0 and 5.0; wherein Sat is saturated fatty acids selected from C16-, C18-, C20-, C22-, and/or C24-fatty acids, and wherein O is oleic acid (C18:1).

In one or more embodiments, the first triglyceride composition is in an amount from 5% to 80% by weight compared to the total weight of the sum of the first triglyceride composition and the second triglyceride composition.

By the first triglyceride composition being in an amount from 5% to 80% by weight compared to the total weight of the sum of the first triglyceride composition and the second triglyceride composition is meant that between 5% and 80% of the total weight of both the first triglyceride composition and the second triglyceride composition is from the first triglyceride composition.

In one or more embodiments, the second triglyceride composition is in an amount from 20% to 95% by weight compared to the total weight of the sum of the first triglyceride composition and the second triglyceride composition.

By the second triglyceride composition being in an amount from 20% to 95% by weight compared to the total weight of the sum of the first triglyceride composition and the second triglyceride composition is meant that between 20% and 95% of the total weight of both the first triglyceride composition and the second triglyceride composition is from the second triglyceride composition.

The vegetable fat composition composed of the first triglyceride composition and the second triglyceride composition can be obtained by any combination of mixing the first triglyceride composition and the second triglyceride composition as long as the first triglyceride composition is in the weight range between 5% and 80%, and the second triglyceride composition is in the weight range between 20% and 95%.

In one or more embodiments, the total amount of the first and the second composition is equal to 100, as exemplified by the below embodiments.

In one or more embodiments, the first triglyceride composition is in an amount of 5% by weight compared to the total weight of the sum of the first triglyceride composition and the second triglyceride composition and wherein the second triglyceride composition is in an amount of 95% by weight compared to the total weight of the sum of the first triglyceride composition and the second triglyceride composition. This means that the combined first and second triglyceride composition makes up 100% by weight of the vegetable fat composition and that 5% of this weight is from the first composition and 95% is from the second composition. In another embodiments, the first triglyceride composition is in an amount of 10% by weight compared to the total weight of the sum of the first triglyceride composition and the second triglyceride composition and wherein the second triglyceride composition is in an amount of 90% by weight compared to the total weight of the sum of the first triglyceride composition and the second triglyceride composition. In yet another embodiments, the first triglyceride composition is in an amount of 15% by weight compared to the total weight of the sum of the first triglyceride composition and the second triglyceride composition and wherein the second triglyceride composition is in an amount of 85% by weight compared to the total weight of the sum of the first triglyceride composition and the second triglyceride composition. In yet another embodiments, the first triglyceride composition is in an amount of 20% by weight compared to the total weight of the sum of the first triglyceride composition and the second triglyceride composition and wherein the second triglyceride composition is in an amount of 80% by weight compared to the total weight of the sum of the first triglyceride composition and the second triglyceride composition. In yet another embodiments, the first triglyceride composition is in an amount of 80% by weight compared to the total weight of the sum of the first triglyceride composition and the second triglyceride composition and wherein the second triglyceride composition is in an amount of 20% by weight compared to the total weight of the sum of the first triglyceride composition and the second triglyceride composition. In one or more embodiments, the first triglyceride composition is in an amount of 75% by weight compared to the total weight of the sum of the first triglyceride composition and the second triglyceride composition and wherein the second triglyceride composition is in an amount of 25% by weight compared to the total weight of the sum of the first triglyceride composition and the second triglyceride composition. In another embodiment, the first triglyceride composition is in an amount of 70% by weight compared to the total weight of the sum of the first triglyceride composition and the second triglyceride composition and wherein the second triglyceride composition is in an amount of 30% by weight compared to the total weight of the sum of the first triglyceride composition and the second triglyceride composition. In yet another embodiment, the first triglyceride composition is in an amount of 65% by weight compared to the total weight of the sum of the first triglyceride composition and the second triglyceride composition and wherein the second triglyceride composition is in an amount of 35% by weight compared to the total weight of the sum of the first triglyceride composition and the second triglyceride composition. In another embodiment, the combined first and second triglyceride composition does not make up 100% by weight of the vegetable fat composition, but additional fat compositions are added to the mixture to obtain a final vegetable fat composition.

In one or more embodiments, the first triglyceride composition comprises from 30% to 80% by weight of C14-fatty acids compared to the total weight of fatty acids in the first triglyceride composition, such as from 30% to 75%, such as from 30% to 70%, such as from 30% to 65%, such as from 30% to 60%, or such as from 35% to 60% by weight of C14-fatty acids compared to the total weight of fatty acids in the first triglyceride composition.

In one or more embodiments, the first triglyceride composition comprises from 0% to 40% by weight of the sum of saturated C16-, C18-, C20-, C22-, C24-fatty acids compared to the total weight of fatty acids in the first triglyceride composition, such as from 0% to 30% by weight, or such as from 0% to 10% by weight of the sum of saturated C16-, C18-, C20-, C22-, C24-fatty acids compared to the total weight of fatty acids in the first triglyceride composition.

In one or more embodiments, the first triglyceride composition comprises from 60% to 100% by weight of saturated fatty acids compared to the total weight of fatty acids in the first triglyceride composition, such as from 70% to 100%, or such as from 75% to 100% by weight of saturated fatty acids compared to the total weight of fatty acids in the first triglyceride composition.

In one or more embodiments, in the first triglyceride composition comprises the ratio of the weight of C14-fatty acids to the total weight of C12- and C14-fatty acids (C14/(C12/C14)) in the first triglyceride composition is between 0.45 and 1.00, such as between 0.50 and 1.00, such as between 0.55 and 1.00, or such as between 0.70 to 1.00.

In one or more embodiments, the first triglyceride composition comprises 45% by weight or less of saturated C12-fatty acids compared to the total weight of fatty acids in the first triglyceride composition.

In one or more embodiments, the first triglyceride composition comprises 40% by weight or less of saturated C12-fatty acids compared to the total weight of fatty acids in the first triglyceride composition, such as 35% by weight or less, such as 30% by weight or less, such as 25% by weight or less, such as 20% by weight or less, such as 15% by weight or less, or such as 10% by weight or less of saturated C12-fatty acids compared to the total weight of fatty acids in the first triglyceride composition.

In one or more embodiments, the first triglyceride composition is not selected from Babussa oil or Nutmeg oil.

In one or more embodiments, the second triglyceride composition comprises from 30% to 75% by weight of the sum of saturated C16-, C18-, C20-, C22-, C24-fatty acids compared to the total weight of fatty acids in the second triglyceride composition, such as from 35% to 75%, such as from 40% to 75%, or such as from 45% to 75% by weight of the sum of saturated C16-, C18-, C20-, C22-, C24-fatty acids compared to the total weight of fatty acids in the second triglyceride composition.

In one or more embodiments, the second triglyceride composition comprises from 30% to 80% by weight of the sum of saturated C16- and C18-fatty acids compared to the total weight of fatty acids in the second triglyceride composition, such as from 30% to 75%, such as from 35% to 75%, such as from 40% to 75%, or such as from 45% to 75% by weight of the sum of saturated C16- and C18-fatty acids compared to the total weight of fatty acids in the second triglyceride composition.

In one or more embodiments, the second triglyceride composition comprises from 35% to 90% by weight of the sum of SatSatO and SatOSat triglycerides compared to the total weight of triglycerides in the second triglyceride composition, such as from 35% to 85%, such as from 40% to 85%, such as from 35% to 80%, such as from 40% to 75%, such as from 50% to 75%, or such as from 50% to 70% by weight of the sum SatSatO and SatOSat triglycerides compared to the total weight of triglycerides in the second triglyceride composition.

In one or more embodiments, in the second triglyceride composition the ratio of the weight of SatSatO triglycerides to the weight of SatOSat triglycerides in the second triglyceride composition is between 1.0 and 4.0, such as from 1.5 to 4.0, such as from 1.5 to 3.0, such as from 1.5 to 2.5, such as from 1.8 to 2.5.

In one or more embodiments, the second triglyceride composition comprises 20% by weight or less of saturated C12-fatty acids compared to the total weight of fatty acids in the second triglyceride composition, such as 15% by weight or less, such as 10% by weight or less, or such as 5% by weight or less of saturated C12-fatty acids compared to the total weight of fatty acids in the second triglyceride composition.

In one or more embodiments, the second triglyceride composition is obtained from palm oil, palm oil fractions, shea oil, shea oil fractions, or combinations hereof.

In one or more embodiments, the vegetable fat composition is for use in bakery, dairy, or confectionary applications, such as biscuit, cake, muffin, donut, pastry, or bread applications. In another embodiment the vegetable fat composition is for use in molding, coating, enrobing, or filling chocolate or chocolate-like applications, such as chocolate or chocolate-like coating.

In one or more embodiments according to the second aspect, the bakery or confectionary application is selected from biscuit, cake, muffin, donut, pastry, or bread applications.

In one or more embodiments where the vegetable fat composition is for use in confectionary or chocolate-like products, said confectionary or chocolate-like product comprises between 0.1% and 2% sorbitan tristearate (STS). In another embodiment said confectionary or chocolate-like product does not comprises sorbitan tristearate (STS).

When describing the embodiments, the combinations and permutations of all possible embodiments have not been explicitly described. Nevertheless, the mere fact that certain measures are recited in mutually different dependent claims or described in different embodiments does not indicate that a combination of these measures cannot be used to advantage. The present invention envisages all possible combinations and permutations of the described embodiments.

The invention is further described in the following non-limiting items.

1. A vegetable fat composition comprising:
   from 4% to 50% by weight of C14-fatty acids compared to the total weight of fatty acids;
   from 40% to 95% by weight of saturated fatty acids compared to the total weight of fatty acids;
   a ratio of the weight of C14-fatty acids to the total weight of C12- and C14-fatty acids between 0.40 and 1.00;
   from 15% to 70% by weight of the sum of SatSatO and SatOSat triglycerides compared to the total weight of triglycerides;
   a ratio of the weight of SatSatO triglycerides to the weight of SatOSat triglycerides between 1.0 and 5.0;

wherein Sat is saturated fatty acids selected from C16-, C18-, C20-, C22-, and/or C24-fatty acids, and wherein O is oleic acid (C18:1).
2. The vegetable fat composition according to item 1, wherein Sat is saturated fatty acids individually selected from C16-, C18-, C20-, C22-, and/or C24-fatty acids.
3. The vegetable fat composition according to item 1, wherein Sat is saturated fatty acids selected from C16- and C18-fatty acids.
4. The vegetable fat composition according to item 3, wherein Sat is saturated fatty acids individually selected from C16- and C18-fatty acids.
5. The vegetable fat composition according to any of the preceding items, comprising from 5% to 40% by weight of C14-fatty acids compared to the total weight of fatty acids, such as from 5% to 35%, such as from 5% to 30%, such as from 6% to 30%, such as from 6% to 25%, or such as from 6% to 20% by weight of C14-fatty acids compared to the total weight of fatty acids.
6. The vegetable fat composition according to item 5, comprising from 6% to 25% by weight of C14-fatty acids compared to the total weight of fatty acids.
7. The vegetable fat composition according to item 5, comprising from 6% to 20% by weight of C14-fatty acids compared to the total weight of fatty acids.
8. The vegetable fat composition according to any of the preceding items, comprising from 45% to 95% by weight of saturated fatty acids compared to the total weight of fatty acids, such as from 45% to 90%, such as from 50% to 90%, such as from 55% to 90%, such as from 60% to 90%, such as from 60% to 85%, such as from 60% to 80%, such as from 60% to 75%, or such as from 65% to 75% by weight of saturated fatty acids compared to the total weight of fatty acids.
9. The vegetable fat composition according to item 8, comprising from 60% to 75% by weight of saturated fatty acids compared to the total weight of fatty acids.
10. The vegetable fat composition according to item 8, comprising from 65% to 75% by weight of saturated fatty acids compared to the total weight of fatty acids.
11. The vegetable fat composition according to any of the preceding items, wherein the ratio of the weight of C14-fatty acids to the total weight of C12- and C14-fatty acids is between 0.45 and 1.00, such as between 0.50 and 1.00, such as between 0.60 and 1.00, such as between 0.70 and 1.00, or such as between 0.70 and 0.90.
12. The vegetable fat composition according to item 11, wherein the ratio of the weight of C14-fatty acids to the total weight of C12- and C14-fatty acids is between 0.50 and 1.00.
13. The vegetable fat composition according to item 11, wherein the ratio of the weight of C14-fatty acids to the total weight of C12- and C14-fatty acids is between 0.70 and 0.90.
14. The vegetable fat composition according to any of the preceding items, comprising from 20% to 70% by weight of the sum of SatSatO and SatOSat triglycerides compared to the total weight of triglycerides, such as from 20% to 65%, such as from 20% to 60%, such as from 20% to 55% by weight of the sum of SatSatO and SatOSat triglycerides compared to the total weight of triglycerides.

15. The vegetable fat composition according to item 14, comprising from 20% to 55% by weight of the sum of SatSatO and SatOSat triglycerides compared to the total weight of triglycerides.

16. The vegetable fat composition according to any of the preceding items, wherein the ratio of the weight of SatSatO triglycerides to the weight of SatOSat triglycerides in the vegetable fat composition is between 1.0 and 4.0, such as between 1.0 and 3.0, such as between 1.0 and 2.5, such as between 1.2 and 2.5, or such as between 1.4 and 2.5.

17. The vegetable fat composition according to item 16, wherein the ratio of the weight of SatSatO triglycerides to the weight of SatOSat triglycerides in the vegetable fat composition is between 1.4 and 2.5.

18. The vegetable fat composition according to item 1, comprising:
   from 6% to 25% by weight of C14-fatty acids compared to the total weight of fatty acids;
   from 60% to 75% by weight of saturated fatty acids compared to the total weight of fatty acids;
   a ratio of the weight of C14-fatty acids to the total weight of C12- and C14-fatty acids between 0.50 and 1.00;
   from 20% to 55% by weight of the sum of SatSatO and SatOSat triglycerides compared to the total weight of triglycerides;
   a ratio of the weight of SatSatO triglycerides to the weight of SatOSat triglycerides between 1.4 and 2.5.

19. The vegetable fat composition according to item 1, comprising:
   from 6% to 20% by weight of C14-fatty acids compared to the total weight of fatty acids;
   from 65% to 75% by weight of saturated fatty acids compared to the total weight of fatty acids;
   a ratio of the weight of C14-fatty acids to the total weight of C12- and C14-fatty acids between 0.70 and 0.90;
   from 20% to 55% by weight of the sum of SatSatO and SatOSat triglycerides compared to the total weight of triglycerides;
   a ratio of the weight of SatSatO triglycerides to the weight of SatOSat triglycerides between 1.4 and 2.5.

20. The vegetable fat composition according to any of the preceding items, wherein the vegetable fat composition has a solid fat content (SFC) value at 35° C. of 20 or less, such as 19 or less, such as 18 or less, such as 17 or less, such as 16 or less, or such as 15 or less, wherein the solid fat content is measured by IUPAC 2.150a.

21. The vegetable fat composition according to any of the preceding items, wherein the vegetable fat composition has a solid fat content (SFC) value at 20° C. of 20 or more, such as 30 or more, such as 40 or more, such as 50 or more, such as 60 or more, such as 80 or more, or such as 85 or more, wherein the solid fat content is measured by IUPAC 2.150a.

22. The vegetable fat composition according to any of the preceding items, wherein the vegetable fat composition has a solid fat content (SFC) value at 40° C. of 20 or less, such as 18 or less, such as 16 or less, such as 14 or less, such as 12 or less, or such as 10 or less, wherein the solid fat content is measured by IUPAC 2.150a.

23. The vegetable fat composition according to any of the preceding items, wherein the amount of saturated fatty acids is comparable to the amount of saturated fatty acids in cocoa butter.

24. The vegetable fat composition according to any of the preceding items, wherein the vegetable fat composition is not originating from a single cell organism.

25. The vegetable fat composition according to any of the preceding items, comprising 20% or less by weight of C12-fatty acid compared to the total weight of fatty acids, such as 18% or less, such as 16% or less such as 14% or less, such as 12% or less, such as 10% or less, such as 7% or less, or such as 5% or less by weight of C12-fatty acid compared to the total weight of fatty acids.

26. The vegetable fat composition according to any of the preceding items, comprising 15% or less by weight of trans-unsaturated fatty acids compared to the total weight of fatty acids, such as 10 wt. % or less, such as 5 wt. % or less, such as 2 wt. % or less, or such as 1 wt. % or less by weight of trans-unsaturated fatty acids compared to the total weight of fatty acids.

27. The vegetable fat composition according to any of the preceding items, wherein the vegetable fat composition is non-hydrogenated.

28. The vegetable fat composition according to any of the preceding items, wherein the vegetable fat composition is a non-trans vegetable fat composition.

29. The vegetable fat composition according to any of the preceding items, comprising at least 5% by weight of unsaturated fatty acids compared to the total weight of fatty acids, such as at least 10%, such as at least 15%, or such as at least 20% by weight of unsaturated fatty acids compared to the total weight of fatty acids.

30. The vegetable fat composition according to any of the preceding items, comprising 60% or less by weight of unsaturated fatty acids compared to the total weight of fatty acids, such as 50% or less, such as 40% or less, such as 30% or less, or such as 20% or less by weight of unsaturated fatty acids compared to the total weight of fatty acids.

31. The vegetable fat composition according to any of the preceding items, comprising between 5% and 60% by weight of unsaturated fatty acids compared to the total weight of fatty acids, such as between 10% and 40%, such as between 15% and 40%, such as between 15% and 35%, such as between 20% and 35%, or such as between 25% and 35% by weight of unsaturated fatty acids compared to the total weight of fatty acids.

32. The vegetable fat composition according to any of the preceding items, wherein the vegetable fat composition comprises between 5% and 60% by weight of C16-fatty acids compared to the total weight of fatty acids, such as 10% and 58%, such as 10% and 56%, such as 10% and 54%, such as 10% and 52%, or such as 15% and 52% by weight of C16-fatty acids compared to the total weight of fatty acids, wherein the C16-fatty acids are selected from C16:0 (palmitic acid), C16:1 (palmitoleic acid), or combinations hereof.

33. The vegetable fat composition according to any of the preceding items, wherein the vegetable fat composition comprises between 5% and 40% by weight of C18-fatty acids compared to the total weight of fatty acids, such as between 10% and 40%, such as between 15% and 40%, such as between 20% and 40% by weight of C18-fatty acids compared to the total weight of fatty acids, wherein the C18-fatty acids are selected from C18:0 (stearic acid), C18:1 (oleic acid), C18:2 (linoleic acid), or combinations hereof.

34. The vegetable fat composition according to any of the preceding items, wherein the vegetable fat composition comprises between 0% and 25% by weight of stearic acid compared to the total weight of fatty acids, such as between 5% and 25%, such as between 5% and 20%, or such as between 10% and 20%.

35. The vegetable fat composition according to any of the preceding items, wherein the vegetable fat composition is a cocoa butter replacer (CBR).

36. The vegetable fat composition according to any of the preceding items, wherein the vegetable fat composition is composed of at least a first triglyceride composition and a second triglyceride composition; wherein the first triglyceride composition comprises fatty acids randomly distributed on a glycerol backbone, and wherein the first triglyceride composition comprises:

from 20% to 90% by weight of C14-fatty acids compared to the total weight of fatty acids in the first triglyceride composition;

from 0% to 50% by weight of the sum of saturated C16-, C18-, C20-, C22-, C24-fatty acids compared to the total weight of fatty acids in the first triglyceride composition;

from 50% to 100% by weight of saturated fatty acids compared to the total weight of fatty acids in the first triglyceride composition;

a ratio of the weight of C14-fatty acids to the total weight of C12- and C14-fatty acids in the first triglyceride composition between 0.40 and 1.00;

and wherein the second triglyceride composition comprises:

from 30% to 80% by weight of the sum of saturated C16-, C18-, C20-, C22-, C24-fatty acids compared to the total weight of fatty acids in the second triglyceride composition;

from 30% to 90% by weight of the sum of SatSatO and SatOSat triglycerides compared to the total weight of triglycerides in the second triglyceride composition;

a ratio of the weight of SatSatO triglycerides to the weight of SatOSat triglycerides in the second triglyceride composition between 1.0 and 5.0;

wherein Sat is saturated fatty acids selected from C16-, C18-, C20-, C22-, and/or C24-fatty acids, and wherein O is oleic acid (C18:1).

37. The vegetable fat composition according to item 36, wherein the first triglyceride composition is comprised in an amount from 5% to 80% by weight compared to the total weight of the sum of the first triglyceride composition and the second triglyceride composition.

38. The vegetable fat composition according to any of items 36-37, wherein the second triglyceride composition is comprised in an amount from 20% to 95% by weight compared to the total weight of the sum of the first triglyceride composition and the second triglyceride composition.

39. The vegetable fat composition according to any of items 36-38, wherein the first triglyceride composition is in an amount of 5%, such as 10%, such as 15%, or such as 20% by weight compared to the total weight of the sum of the first triglyceride composition and the second triglyceride composition and wherein the second triglyceride composition is in an amount of 95%, such as 90%, such as 85%, or such as 82% by weight compared to the total weight of the sum of the first triglyceride composition and the second triglyceride composition.

40. The vegetable fat composition according to any of items 36-38, wherein the first triglyceride composition is in an amount of 10%, such as 15%, or such as 20% by weight compared to the total weight of the sum of the first triglyceride composition and the second triglyceride composition and wherein the second triglyceride composition is in an amount of 90%, such as 85%, or such as 80% by weight compared to the total weight of the sum of the first triglyceride composition and the second triglyceride composition.

41. The vegetable fat composition according to any of items 36-38, wherein the first triglyceride composition is in an amount of 80% by weight compared to the total weight of the sum of the first triglyceride composition and the second triglyceride composition and wherein the second triglyceride composition is in an amount of 20% by weight compared to the total weight of the sum of the first triglyceride composition and the second triglyceride composition.

42. The vegetable fat composition according to any of items 36-38, wherein the first triglyceride composition is in an amount of 75% by weight compared to the total weight of the sum of the first triglyceride composition and the second triglyceride composition and wherein the second triglyceride composition is in an amount of 25% by weight compared to the total weight of the sum of the first triglyceride composition and the second triglyceride composition.

43. The vegetable fat composition according to any of items 36-42, wherein the first triglyceride composition comprises from 30% to 80% by weight of C14-fatty acids compared to the total weight of fatty acids in the first triglyceride composition, such as from 30% to 75%, such as from 30% to 70%, such as from 30% to 65%, such as from 30% to 60%, or such as from 35% to 60% by weight of C14-fatty acids compared to the total weight of fatty acids in the first triglyceride composition.

44. The vegetable fat composition according to any of items 36-43, wherein the first triglyceride composition comprises from 0% to 40% by weight of the sum of saturated C16-, C18-, C20-, C22-, C24-fatty acids compared to the total weight of fatty acids in the first triglyceride composition, such as from 0% to 30% by weight, or such as from 0% to 10% by weight of the sum of saturated C16-, C18-, C20-, C22-, C24-fatty acids compared to the total weight of fatty acids in the first triglyceride composition.

45. The vegetable fat composition according to any of items 36-44, wherein the first triglyceride composition comprises from 60% to 100% by weight of saturated fatty acids compared to the total weight of fatty acids in the first triglyceride composition, such as from 70% to 100%, or such as from 75% to 100% by weight of saturated fatty acids compared to the total weight of fatty acids in the first triglyceride composition.

46. The vegetable fat composition according to any of items 36-45, wherein in the first triglyceride composition comprises the ratio of the weight of C14-fatty acids to the total weight of C12- and C14-fatty acids in the first triglyceride composition is between 0.45 and 1.00, such as between 0.50 and 1.00, such as between 0.55 and 1.00, or such as between 0.70 to 1.00.

47. The vegetable fat composition according to any of items 36-46, wherein the first triglyceride composition comprises 45% by weight or less of saturated C12-fatty acids compared to the total weight of fatty acids in the first triglyceride composition.
48. The vegetable fat composition according to any of items 36-47, wherein the first triglyceride composition comprises 40% by weight or less of saturated C12-fatty acids compared to the total weight of fatty acids in the first triglyceride composition, such as 35% by weight or less, such as 30% by weight or less, such as 25% by weight or less, such as 20% by weight or less, such as 15% by weight or less, or such as 10% by weight or less of saturated C12-fatty acids compared to the total weight of fatty acids in the first triglyceride composition.
49. The vegetable fat composition according to any of items 36-48, wherein the first triglyceride composition is not selected from Babussa oil or Nutmeg oil.
50. The vegetable fat composition according to any of items 36-49, wherein the second triglyceride composition comprises from 30% to 75% by weight of the sum of saturated C16-, C18-, C20-, C22-, C24-fatty acids compared to the total weight of fatty acids in the second triglyceride composition, such as from 35% to 75%, such as from 40% to 75%, or such as from 45% to 75% by weight of the sum of saturated C16-, C18-, C20-, C22-, C24-fatty acids compared to the total weight of fatty acids in the second triglyceride composition.
51. The vegetable fat composition according to any of items 36-50, wherein the second triglyceride composition comprises from 30% to 80% by weight of the sum of saturated C16- and C18-fatty acids compared to the total weight of fatty acids in the second triglyceride composition, such as from 30% to 75%, such as from 35% to 75%, such as from 40% to 75%, or such as from 45% to 75% by weight of the sum of saturated C16- and C18-fatty acids compared to the total weight of fatty acids in the second triglyceride composition.
52. The vegetable fat composition according to any of items 36-51, wherein the second triglyceride composition comprises from 35% to 90% by weight of the sum of SatSatO and SatOSat triglycerides compared to the total weight of triglycerides in the second triglyceride composition, such as from 35% to 85%, such as from 40% to 85%, such as from 35% to 80%, such as from 40% to 75%, such as from 50% to 75%, or such as from 50% to 70% by weight of the sum SatSatO and SatOSat triglycerides compared to the total weight of triglycerides in the second triglyceride composition.
53. The vegetable fat composition according to any of items 36-52, wherein in the second triglyceride composition the ratio of the weight of SatSatO triglycerides to the weight of SatOSat triglycerides in the second triglyceride composition is between 1.0 and 4.0, such as from 1.5 to 4.0, such as from 1.5 to 3.0, such as from 1.5 to 2.5, such as from 1.8 to 2.5.
54. The vegetable fat composition according to any of items 36-53, wherein the second triglyceride composition comprises 20% by weight or less of saturated C12-fatty acids compared to the total weight of fatty acids in the second triglyceride composition, such as 15% by weight or less, such as 10% by weight or less, or such as 5% by weight or less of saturated C12-fatty acids compared to the total weight of fatty acids in the second triglyceride composition.
55. The vegetable fat composition according to any of items 36-54, wherein the second triglyceride composition is obtained from palm oil, palm oil fractions, shea oil, shea oil fractions, or combinations hereof.
56. The vegetable fat composition according to any of items 1-55 wherein the vegetable fat composition is non-lauric.
57. The vegetable fat composition according to any of the preceding claims, for use in bakery, dairy, or confectionary applications.
58. The vegetable fat composition according to item 57, wherein the bakery or confectionary application is selected from biscuit, cake, muffin, donut, pastry, or bread applications.
59. The vegetable fat composition according to any of items 1-56, for use in molding, coating, enrobing, or filling chocolate or chocolate-like applications.
60. The vegetable fat composition according to any of items 1-56, for use as a chocolate or chocolate-like coating.
61. Use of a vegetable fat composition according to any of items 1-60, for bakery, dairy, or confectionary applications.
62. Use of a vegetable fat composition according to any of items 1-60 in coating or enrobing for bakery or confectionary applications.
63. Use of a vegetable fat composition according to any of items 61-62, wherein the bakery or confectionary application is selected from biscuit, cake, muffin, donut, pastry, or bread applications.
64. Use of a vegetable fat composition according to any of items 1-60 in fillings, such as bakery fillings and confectionary fillings.
65. Use of a vegetable fat composition according to any of items 1-60 for chocolate and chocolate-like coatings.
66. Use of a vegetable fat composition according to any of items 1-60 for the manufacture of a processed food product.
67. Use of a vegetable fat composition according to any of items 1-60 as a fat component, which are to be incorporated in a food product.
68. Use of a vegetable fat composition according to any of items 1-60 for chocolate or chocolate-like spreads, which are spreadable at room temperature.
69. A process for obtaining a vegetable fat composition according to any of items 1-60, wherein the process comprises the steps of mixing a first triglyceride composition and a second triglyceride composition, wherein the first triglyceride composition is added in an amount of between 5% and 80% by weight compared to the total weight of the sum of the first triglyceride composition and the second triglyceride composition, and wherein the second triglyceride composition is added in an amount of between 20% and 95% by weight compared to the total weight of the sum of the first triglyceride composition and the second triglyceride composition;
    wherein the first triglyceride composition comprises fatty acids randomly distributed on a glycerol backbone, and wherein the first triglyceride composition comprises:
        from 20% to 90% by weight of C14-fatty acids compared to the total weight of fatty acids in the first triglyceride composition;
        from 0% to 50% by weight of the sum of saturated C16-, C18-, C20-, C22-, C24-fatty acids compared to the total weight of fatty acids in the first triglyceride composition;

from 50% to 100% by weight of saturated fatty acids compared to the total weight of fatty acids in the first triglyceride composition; and a ratio of the weight of C14-fatty acids to the total weight of- and C14-fatty acids in the first triglyceride composition between 0.40 and 1.00;

and wherein the second triglyceride composition comprises:

from 30% to 80% by weight of the sum of saturated C16-, C18-, C20-, C22-, C24-fatty acids compared to the total weight of fatty acids in the second triglyceride composition;

from 30% to 90% by weight of the sum of SatSatO and SatOSat triglycerides compared to the total weight of triglycerides in the second triglyceride composition; and a ratio of the weight of SatSatO triglycerides to the weight of SatOSat triglycerides in the second triglyceride composition between 1.0 and 5.0;

wherein Sat is saturated fatty acids selected from C16-, C18-, C20-, C22-, and/or C24-fatty acids, and wherein O is oleic acid (C18:1), hereby obtaining the vegetable fat composition according to any of items 1-59.

70. A confectionary or chocolate or chocolate-like product comprising between 25% and 70% by weight, such as between 25% and 60%, such as between 25% and 50%, such as between 25% and 40%, such as between 28% and 40% by weight of a vegetable fat composition according to any of items 1-59.

71. A confectionary or chocolate-like product according to item 70, wherein said confectionary or chocolate-like product comprises between 0.1% and 2% sorbitan tristearate (STS).

The present invention is further illustrated by the following examples, which are not to be construed as limiting the scope of protection.

Examples

Example 1: Esterification of Glycerol with Free Fatty Acids

Glycerol and fatty acids were mixed to provide the reaction mixture according to Table 1. The reaction mixture was placed in a 6 L three-necked flask, equipped with a vacuum inlet, a cold trap, and a condenser heated to 70° C. The reaction mixture was heated to 170° C. within 30 minutes under reduced pressure of approximately 100-150 mbar. The reaction mixture was kept at 170-180° C. for 7 hours where the pressure was reduced stepwise to 33 mbar as the reaction time progressed. The temperature was then raised to 210° C. Once the temperature reached 210° C., the reaction mixture was held for 2 hours. Excess free fatty acids from the reaction mixture were distilled off at 240° C. under reduced pressure. The final vegetable fat composition was obtained once the crude oil was bleached, filtered and deodorized.

Table 1 displays the feed composition, free fatty acid composition and solid fat content (SFC) of the triglyceride compositions of the first triglyceride composition.

TABLE 1

| Frist triglyceride composition | A | B | C | D | E | F |
|---|---|---|---|---|---|---|
| Glycerol (g) | 129.0 | 215.0 | 215.0 | 173.0 | 173.0 | 127.5 |
| 99% Lauric acid (g) | 136.5 | 227.5 | 457.5 | 676.0 | 366.0 | 274.0 |
| 99% Myristic acid (g) | 685.5 | 1257.5 | 1187.5 | 676.0 | 1096.0 | 1098.0 |
| 98% Palmitic acid (g) | 82.5 | 137.5 | 137.5 | — | 366.0 | — |
| 98% Stearic acid (g) | 165.0 | 275.0 | 275.0 | 475.0 | — | — |
| 82% Oleic acid (g) | 301.5 | 387.5 | 227.5 | — | — | — |
| Free fatty acid (FFA) | 0.2 | 0.2 | 0.2 | 0.2 | <0.1 | 0.2 |
| Monoglyceride (MAG) | <0.1 | 0.1 | 0.1 | 0.1 | <0.1 | 0.2 |
| Diglyceride (DAG) | 2.1 | 1.4 | 0.8 | 1.9 | 1.40 | 4.3 |
| Triglyceride (TAG) | 94.6 | 97.7 | 98.6 | 97.8 | 98.2 | 95.4 |
| Fatty acid composition of first triglyceride composition | | | | | | |
| C8:0 (% w/w) | — | — | — | — | — | — |
| C10:0 (% w/w) | — | — | — | — | — | — |
| C12:0 (% w/w) | 9.4 | 9.4 | 19.0 | 34.9 | 19.0 | 18.9 |
| C14:0 (% w/w) | 49.4 | 54.4 | 51.9 | 36.8 | 59.6 | 79.8 |
| C16:0 (% w/w) | 6.6 | 6.6 | 6.6 | 0.2 | 21.1 | 0.3 |
| C18:0 (% w/w) | 13.3 | 12.8 | 12.6 | 27.5 | 0.2 | 0.4 |
| C18:1 (% w/w) | 18.4 | 14.3 | 8.4 | 0.3 | — | 0.4 |
| C18:2 (% w/w) | 2.4 | 2.1 | 1.2 | — | — | — |
| C20:0 (% w/w) | 0.2 | 0.1 | 0.1 | 0.2 | — | — |
| C20:1 (% w/w) | — | — | — | — | — | — |
| Other fatty acids | 0.3 | 0.3 | 0.2 | 0.1 | 0.1 | 0.2 |
| SAFA (% w/w) | 78.9 | 83.3 | 90.0 | 100.0 | 100.0 | 100.0 |
| Sum C16:0 to C24:0 (% w/w) | 20.1 | 19.5 | 19.3 | 27.9 | 21.3 | 0.7 |
| Ratio C14/C12 + C14 | 0.84 | 0.85 | 0.73 | 0.51 | 0.76 | 0.81 |
| Solid fat content (SFC) of first triglyceride composition | | | | | | |
| SFC (10° C.) | 88.0 | 92.7 | 95.9 | 97.8 | 98.7 | 98.2 |
| SFC (20° C.) | 76.7 | 87.0 | 94.2 | 96.3 | 98.4 | 97.8 |
| SFC (25° C.) | 63.4 | 76.9 | 88.5 | 95.4 | 98.0 | 97.6 |
| SFC (30° C.) | 45.7 | 60.7 | 72.4 | 83.4 | 97.8 | 96.8 |
| SFC (35° C.) | 21.9 | 35.5 | 39.9 | 38.3 | 94.8 | 90.4 |
| SFC (40° C.) | <0.5 | 5.2 | 2,1 | 1.7 | 54.5 | 64.4 |

The fatty acid composition of vegetable fat compositions is analysed using IUPAC 2.301 (Methylation) and IUPAC 2.304 (GLC). The solid fat content (SFC) is measured according to IUPAC 2.150a.

Samples D, E, and F all have SAFA content of 100% but the SFC profile specifically at 35° C. and above is significantly lower for sample D compared to samples E and F. This may be explained by a significantly different fatty acid composition of sample D compared with E and F. The difference between D compared to E and F is the type of fatty acids and the proportion of them. However, despite E and F having significantly different fatty acid compositions they show a similar SFC profile. As can be seen by comparing samples D-F with sample A, a reduction in SAFA content from 100% to 78.9% (sample A) can significantly improve the melt-down of the sample.

Table 2 displays the specifications of a triglyceride composition of the second triglyceride composition. P, O and S represent palmitic acid, oleic acid and stearic acid, respectively.

TABLE 2

| Second triglyceride composition | G |
|---|---|
| SOS (% w/w) | 1.5 |
| SSO (% w/w) | 1.7 |
| POS (% w/w) | 5.3 |
| PSO (% w/w) | 10.3 |
| POP (% w/w) | 14.7 |
| PPO (% w/w) | 29.1 |
| Sum C16:0 to C24:0 (% w/w) | 98.4 |
| Sum of SatSatO and SatOSat (% w/w) | 63.0 |
| Ratio SatSatO/SatOSat | 1.9 |
| Solid fat content (SFC) | |
| SFC (10° C.) | 90.9 |
| SFC (20° C.) | 83.9 |
| SFC (25° C.) | 62.0 |
| SFC (30° C.) | 33.8 |
| SFC (35° C.) | 16.3 |
| SFC (40° C.) | 5.8 |

The fatty acid composition of vegetable fat compositions is analysed using IUPAC 2.301 (Methylation). The triglyceride composition of vegetable fat compositions is analysed using AOCS Ce 5b-89. The solid fat content (SFC) is measured according to IUPAC 2.150a.

Table 3 displays fatty acid composition and solid fat content of the vegetable fat compositions after mixture of the first triglyceride composition with the second triglyceride composition according to the amounts in the table. The reference used is AAK's commercially available non-hydro CBR, Akopol™ NH 53.

TABLE 3

| Vegetable fat composition | A1 | A2 | A3 | B1 | B2 | C1 | D1 | E1 | F1 | Commercially available non-hydro CBR (Akopol ™ NH 53) |
|---|---|---|---|---|---|---|---|---|---|---|
| First TAG composition (% w/w) | 20 (A) | 50 (A) | 70 (A) | 20 (B) | 40 (B) | 30 (C) | 20 (D) | 20 (E) | 20 (F) | — |
| Second TAG composition (% w/w) | 80 (G) | 50 (G) | 30 (G) | 80 (G) | 60 (G) | 70 (G) | 80 (G) | 80 (G) | 80 (G) | — |
| Fatty acid composition | | | | | | | | | | |
| C12:0 (% w/w) | 2.1 | 4.8 | 6.7 | 2.1 | 3.9 | 5.8 | 7.1 | 4.0 | 4.0 | 4.2 |
| C14:0 (% w/w) | 10.4 | 24.9 | 34.7 | 11.8 | 22.4 | 16.0 | 8.1 | 12.8 | 16.8 | 2.6 |
| C16:0 (% w/w) | 44.8 | 30.7 | 21.0 | 44.5 | 35.0 | 40.0 | 43.4 | 47.4 | 43.3 | 50.5 |
| C18:0 (% w/w) | 10.9 | 11.7 | 12.5 | 10.2 | 10.8 | 11.3 | 13.8 | 7.6 | 8.4 | 9.5 |
| C18:1 (% w/w) | 26.0 | 23.1 | 21.2 | 25.4 | 22.6 | 22.0 | 22.2 | 22.6 | 22.2 | 26.6 |
| C18:2 (% w/w) | 4.5 | 3.7 | 3.1 | 4.6 | 4.0 | 3.9 | 4.0 | 4.2 | 4.0 | 4.7 |
| C20:0 (% w/w) | 0.5 | 0.4 | 0.3 | 0.5 | 0.4 | 0.5 | 0.5 | 0.5 | 0.5 | 0.5 |
| C20:1 (% w/w) | 0.1 | 0.1 | 0.1 | 0.2 | 0.1 | 0.1 | 0.1 | 0.1 | 0.1 | 0.1 |
| Other fatty acids (% w/w) | 0.7 | 0.6 | 0.4 | 0.7 | 0.8 | 0.4 | 0.8 | 0.8 | 0.7 | 1.3 |
| Trans fatty acids (% w/w) | <1.0 | <1.0 | <1.0 | <1.0 | <1.0 | <1.0 | <1.0 | <1.0 | <1.0 | <1.0 |
| SAFA (% w/w) | 68.8 | 72.5 | 75.2 | 69.1 | 72.7 | 73.6 | 73.0 | 73.0 | 73.1 | 67.8 |

TABLE 3-continued

| Vegetable fat composition | A1 | A2 | A3 | B1 | B2 | C1 | D1 | E1 | F1 | Commercially available non-hydro CBR (Akopol ™ NH 53) |
|---|---|---|---|---|---|---|---|---|---|---|
| Ratio C14/C12 + C14 | 0.83 | 0.84 | 0.84 | 0.85 | 0.85 | 0.73 | 0.53 | 0.76 | 0.81 | 0.38 |
| Sum of SatSatO and SatOSat (% w/w) * | 50.8 | 31.9 | 20.4 | 50.7 | 38.5 | 44.4 | 50.4 | 50.4 | 50.4 | 59.9 |
| Ratio SatSatO/SatOSat * | 1.92 | 1.9 | 1.97 | 1.92 | 1.94 | 1.93 | 1.52 | 1.52 | 1.52 | 1.87 |
| Solid fat content (SFC) of vegetable fat composition | | | | | | | | | | |
| SFC (10° C.) | 92.3 | 91.4 | 87.7 | 93.8 | 93.1 | 94.2 | 92.6 | 94.1 | 94.1 | 92.3 |
| SFC (20° C.) | 82.2 | 76.5 | 74.4 | 82.6 | 79.2 | 83.5 | 86.2 | 88.3 | 87.1 | 84.5 |
| SFC (25° C.) | 59.0 | 59.2 | 60.2 | 58.6 | 61.8 | 63.8 | 64.9 | 69.2 | 65.4 | 58.2 |
| SFC (30° C.) | 35.1 | 36.5 | 39.5 | 33.8 | 38.2 | 39.4 | 38.6 | 45.4 | 40 | 33.3 |
| SFC (35° C.) | 14.2 | 14.3 | 15.4 | 14.8 | 15.9 | 14.5 | 15.8 | 18.5 | 13.6 | 12.7 |
| SFC (40° C.) | 0.6 | <0.5 | <0.5 | 3.0 | 0.8 | <0.5 | <0.5 | 1.1 | <0.5 | <0.5 |

* Where Sat is the sum of saturated fatty acids C16:0-C24:0.

The fatty acid composition of vegetable fat compositions is analysed using IUPAC 2.301 (Methylation). The triglyceride composition of vegetable fat compositions is analysed using AOCS Ce 5b-89. The solid fat content (SFC) is measured according to IUPAC 2.150a.

Example 2: Recipes and Manufacture of Dark Chocolate-Like Compounds

Table 4 displays the recipe for a dark chocolate compound.

TABLE 4

| Dark chocolate-like compound composition | |
|---|---|
| Vegetable fat (% w/w) | 30.0 |
| Cocoa powder (10-12% CB) (% w/w) | 15.0 |
| Sugar (% w/w) | 48.6 |
| Sorbitan tristearate (% w/w) | 0.4 |
| Skim milk powder (% w/w) | 6.0 |
| Lecithin (% w/w) | 0.4 |
| Total fat content (% w/w) | 31.7 |
| Cocoa butter (%) | 5.2 |
| Milk fat (%) | 0.2 |
| **The fat composition distribution in the recipe** | |
| Vegetable fat (%) | 94.6 |
| Cocoa butter (%) | 5.2 |
| Milk fat (%) | 0.2 |

Example 3: Crystallization Speed of Vegetable Fat Compositions A1, A2, A3, E1, F1, and the Reference Six different dark chocolate-like compounds were produced according to the recipe given in table 4 and using vegetable fat compositions A1, A2, A3, E1, F1, and the reference (Akopol™ NH 53) in table 3, respectively.

All the ingredients for producing the dark chocolate-like compounds were mixed in a Hobart N-50 mixer at 65° C. for 10 minutes and refined in a Buhler SDY-300 three-roll refiner to a particle size of approximately 20μ. Afterwards, the dark compounds were conched in the Hobart mixer for 6 hours at 65° C.

Evaluation of Crystallization Speed for Dark Compound Coatings on Biscuits:

Biscuits were coated with the dark chocolate-like compound coatings created above. Coating was performed at 45° C. in a Nielsen enrobing machine followed by cooling in a three-zone cooling tunnel at temperatures of 15° C., 12° C., and 15° C. for 15 minutes. The coatings were evaluated immediately after the cooling period. The dark compound coatings on the biscuits are subjectively evaluated at specific cooling times and the coating is evaluated according to the following score scaling:

1. The coating is still liquid on some parts of the biscuit, while other parts are semi solidified.
2. The whole coating is semi solidified, but very sticky and very soft. There is no liquid coating parts on biscuit anymore.
3. The whole coating has solidified; however, the coating is still sticky, soft, and not ready for packaging.
4. The whole coating is hard and not sticky. It is possibly to pack the product.

Score value 4 is the most important score as it indicates that the coated biscuits are ready for flow packing. Results of crystallization speed for compound coatings of biscuits are illustrated in Table 5.

TABLE 5

Crystallization speed of dark chocolate-like compound coatings made with the vegetable fat compositions compared with the reference.

| Dark chocolate-like compound | 5A1 | 5A2 | 5A3 | 5E1 | 5F1 | |
|---|---|---|---|---|---|---|
| Vegetable fat composition | A1 | A2 | A3 | E1 | F1 | Commercially available non-hydro CBR (Akopol ™ NH 53) |
| | Crystallization speed | | | | | |
| 3 minutes | 3 | 3 | 3 | 3 | 3 | 2 |
| 4 minutes | 3 | 4 | 4 | 4 | 4 | 2 |

TABLE 5-continued

Crystallization speed of dark chocolate-like compound coatings made with the vegetable fat compositions compared with the reference.

| | | | | | | |
|---|---|---|---|---|---|---|
| 5 minutes | 3 | — | — | — | — | 3 |
| 6 minutes | 3 | — | — | — | — | 3 |
| 7 minutes | 4 | — | — | — | — | 3 |
| 8 minutes | — | — | — | — | — | 3 |
| 9 minutes | — | — | — | — | — | 4 |

Dark compounds of 5A1, 5A2, and 5A3 are all comprised of TAG composition A in different ratios of 20%, 50%, and 70%, respectively. Results show that crystallization speed can be significantly improved with inclusion of 20% to 70% of the first triglyceride composition in the vegetable fat composition. Inclusion of only 20% of the first triglyceride composition inside the vegetable fat compositions E1 and F1 has resulted in a significantly faster crystallization speed compared with the reference. The difference is as large as 5 minutes for reaching score 4. Compound 5A2 having a comparable SAFA content and a similar crystallization speed to those of 5E1 and 5F1, contains 50% of the first triglyceride composition compared to 20% in compounds 5E1 and 5F1.

Example 6: Solidification Time of Compound Tablets

The chocolate-like compounds were transferred into 50 g moulds at 45° C. followed by cooling in a three-zone cooling tunnel with temperatures of 15° C., 12° C., and 15° C., respectively for 30 minutes. The tablets were immediately evaluated after the cooling period. Cooling was repeated for the tablets that were not 100% solidified and thus releasable from the mould. Table 6 summarizes the results of solidification time for the chocolate-like compound tablets.

TABLE 6

Solidification time of dark chocolate-like compound tablets produced with the vegetable fat compositions as compared with the reference.

| Compound tablet | 6A2 | 6D1 | 6E1 | 6F1 | |
|---|---|---|---|---|---|
| Vegetable fat composition | A2 | D1 | E1 | F1 | Commercially available non-hydro CBR (Akopol ™ NH 53) |
| Solidification time (minutes) | 30 | 30 | 30 | 30 | 60 |

Results indicate that compound tablets produced with the vegetable fat compositions A2, D1, E1, and F1 performed significantly better with a halved solidification time compared with the reference.

Example 7: Texture Analysis of Compound Tablets

The chocolate-like compound tablets produced according to example 6 were stored at temperature of 20° C. for a week after they have been cooled for a total of 60 minutes (complete solidification). Texture measurement was performed at 20° C. using a texture analyser XT2i with a probe P2N and 5 mm penetration. Table 7 shows the mean values of five measurements of the penetration force measured in grams.

TABLE 7

Texture measured in chocolate-like compound tablets as compared with the reference.

| Compound tablets | 6A2 | 6D1 | 6E1 | 6F1 | |
|---|---|---|---|---|---|
| Vegetable fat composition | A2 | D1 | E1 | F1 | Commercially available non-hydro CBR (Akopol ™ NH 53) |
| Texture (g) after 1 week at 20° C. | 404 ± 4.2 | 514 ± 2.1 | 579 ± 4.6 | 555 ± 8.9 | 465 ± 4.7 |

Results show a significantly higher texture in compound tablet made with vegetable fat compositions D1, E1, and F1 as compared with the reference. Lower texture of compound tablet 6A2 compared with 6D1, 6E1, and 6F1 may be explained by their fatty acid compositions.

Even though vegetable fat composition A2 has resulted in a significantly faster crystallization speed and a significantly faster solidification of compound tablets, it has a lower texture compared (a high texture is preferred) with the reference. Therefore, the choice of a vegetable fat composition may be a compromise between the proportion of the first triglyceride composition in the final vegetable fat composition and its performance. If inclusion of a higher content of the first triglyceride composition (with a lower SAFA content, for example 78.9% in case of sample A) is an important factor, a reduction in the texture should be expected. However, only 20% of the first triglyceride composition with 100% SAFA (samples D, E, and F) in the final vegetable fat composition not only resulted in a significantly faster crystallization speed and solidification of compound tablets, but also results in a significantly higher texture compared with both compound tablet 6A2 and the reference.

Example 8: Bloom Test of Vegetable Fat Compositions A2, D1, E1, F1, and the Reference 50 g moulded tablets as well as coated biscuits were produced with vegetable fat compositions A2, D1, E1, F1, and the reference. Both tablets and coated biscuits were cooled in a three-zone cooling tunnel for 30 minutes at a temperature of 15° C. followed by 12° C. and finally 15° C. After 2 days of storage at 20° C., samples were moved into bloom cabinets for bloom tests. Tablets and coated biscuits were tested according to the following conditions:

Tablets:

Isothermal temperature of 15° C.

Isothermal temperature of 20° C.

Coated Biscuits:

Isothermal temperature of 15° C.

Isothermal temperature of 20° C.

Isothermal temperature of 23° C.

Table 8 illustrates the bloom test results for tablets and coated biscuits produced using vegetable fat compositions A2, D1, E1, F1, and the reference.

TABLE 8 bloom results for tables and coated biscuits.

| Vegetable fat compositions | | | | | |
|---|---|---|---|---|---|
| | A2 | D1 | E1 | F1 | Commercially available non-hydro CBR (Akopol ™ NH 53) |
| Bloom stability (Number of weeks) 50 g tablets | | | | | |
| 15° C. | >51 | >52 | >52 | >52 | >50 |
| 20° C. | >51 | 50 | >52 | 36 | >50 |
| Coated biscuits | | | | | |
| 15° C. | >51 | >52 | >52 | 33 | 10 |
| 20° C. | >51 | >52 | >52 | >50 | >50 |
| 23° C. | >51 | >52 | >52 | >50 | >50 |

Results showed that the coated biscuits made with the reference fat bloomed already after 10 weeks of storage at 15° C., whereas all other samples were bloom-stable for significantly longer time.

The invention claimed is:

1. A vegetable fat composition comprising:

from 4% to 50% by weight of C14-fatty acids compared to the total weight of fatty acids;

from 40% to 95% by weight of saturated fatty acids compared to the total weight of fatty acids;

a ratio of the weight of C14-fatty acids to the total weight of C12- and C14-fatty acids between 0.40 and 1.00;

from 15% to 70% by weight of the sum of SatSatO and SatOSat triglycerides compared to the total weight of triglycerides; and a ratio of the weight of SatSatO triglycerides to the weight of SatOSat triglycerides between 1.0 and 5.0;

wherein Sat is saturated fatty acids selected from C16-, C18-, C20-, C22-, and/or C24-fatty acids, and wherein O is oleic acid (C18:1).

2. The vegetable fat composition according to claim 1, comprising from 5% to 40% by weight of C14-fatty acids compared to the total weight of fatty acids.

3. The vegetable fat composition according to claim 1, comprising from 45% to 95% by weight of saturated fatty acids compared to the total weight of fatty acids.

4. The vegetable fat composition according to claim 1, wherein the ratio of the weight of C14-fatty acids to the total weight of C12- and C14-fatty acids is between 0.45 and 1.00.

5. The vegetable fat composition according to claim 1, comprising from 20% to 70% by weight of the sum of SatSatO and SatOSat triglycerides compared to the total weight of triglycerides.

6. The vegetable fat composition according to claim 1, wherein the ratio of the weight of SatSatO triglycerides to the weight of SatOSat triglycerides in the vegetable fat composition is between 1.0 and 4.0.

7. The vegetable fat composition according to claim 1, wherein the vegetable fat composition is composed of at least a first triglyceride composition and a second triglyceride composition; wherein the first triglyceride composition comprises fatty acids randomly distributed on a glycerol backbone, and wherein the first triglyceride composition comprises:

from 20% to 90% by weight of C14-fatty acids compared to the total weight of fatty acids in the first triglyceride composition;

from 0% to 50% by weight of the sum of saturated C16-, C18-, C20-, C22-, C24-fatty acids compared to the total weight of fatty acids in the first triglyceride composition;

from 50% to 100% by weight of saturated fatty acids compared to the total weight of fatty acids in the first triglyceride composition; and a ratio of the weight of C 14-fatty acids to the total weight of C12- and C 14-fatty acids in the first triglyceride composition between 0.40 and 1.00;

and wherein the second triglyceride composition comprises:

from 30% to 80% by weight of the sum of saturated C16-, C18-, C20-, C22-, C24-fatty acids compared to the total weight of fatty acids in the second triglyceride composition;

from 30% to 90% by weight of the sum of SatSatO and SatOSat triglycerides compared to the total weight of triglycerides in the second triglyceride composition; and a ratio of the weight of SatSatO triglycerides to the weight of SatOSat triglycerides in the second triglyceride composition between 1.0 and 5.0;

wherein Sat is saturated fatty acids selected from C16-, C18-, C20-, C22-, and/or C24-fatty acids, and wherein O is oleic acid (C18:1).

8. The vegetable fat composition according to claim 7, wherein the first triglyceride composition is comprised in an amount from 5% to 80% by weight compared to the total weight of the sum of the first triglyceride composition and the second triglyceride composition.

9. The vegetable fat composition according to claim 7, wherein the second triglyceride composition is comprised in an amount from 20% to 95% by weight compared to the total weight of the sum of the first triglyceride composition and the second triglyceride composition.

10. The vegetable fat composition according to claim 1, wherein the vegetable fat composition is non-lauric.

11. The vegetable fat composition according to claim 1, wherein the vegetable fat composition is used for bakery, dairy, or confectionary applications, or in coating or enrobing for bakery or confectionary applications.

12. A process for obtaining a vegetable fat composition according to claim 1, wherein the process comprises the steps of mixing a first triglyceride composition and a second triglyceride composition, wherein the first triglyceride composition is added in an amount of between 5% and 80% by weight compared to the total weight of the sum of the first triglyceride composition and the second triglyceride composition, and wherein the second triglyceride composition is added in an amount of between 20% and 95% by weight compared to the total weight of the sum of the first triglyceride composition and the second triglyceride composition;

wherein the first triglyceride composition comprises fatty acids randomly distributed on a glycerol backbone, and wherein the first triglyceride composition comprises:

from 20% to 90% by weight of C14-fatty acids compared to the total weight of fatty acids in the first triglyceride composition;

from 0% to 50% by weight of the sum of saturated C16-, C18-, C20-, C22-, C24-fatty acids compared to the total weight of fatty acids in the first triglyceride composition;

from 50% to 100% by weight of saturated fatty acids compared to the total weight of fatty acids in the first triglyceride composition; and a ratio of the weight of C 14-fatty acids to the total weight of C12- and C 14-fatty acids in the first triglyceride composition between 0.40 and 1.00;

and wherein the second triglyceride composition comprises:

from 30% to 80% by weight of the sum of saturated C16-, C18-, C20, C22-, C24-fatty acids compared to the total weight of fatty acids in the second triglyceride composition;

from 30% to 90% by weight of the sum of SatSatO and SatOSat triglycerides compared to the total weight of triglycerides in the second triglyceride composition; and a ratio of the weight of SatSatO triglycerides to the weight of SatOSat triglycerides in the second triglyceride composition between 1.0 and 5.0;

wherein Sat is saturated fatty acids selected from C16-, C18-, C20-, C22-, and/or C24-fatty acids, and wherein O is oleic acid (C18:1).

13. A confectionary or chocolate or chocolate-like product comprising between 25% and 70% by weight of a vegetable fat composition according to claim 1.

14. A confectionary or chocolate-like product according to claim 13, wherein said confectionary or chocolate-like product comprises between 0.1% and 2% sorbitan tristearate (STS).

* * * * *